(No Model.)
C. E. SMITH.
MITER CUTTER.
No. 525,725.  Patented Sept. 11, 1894.
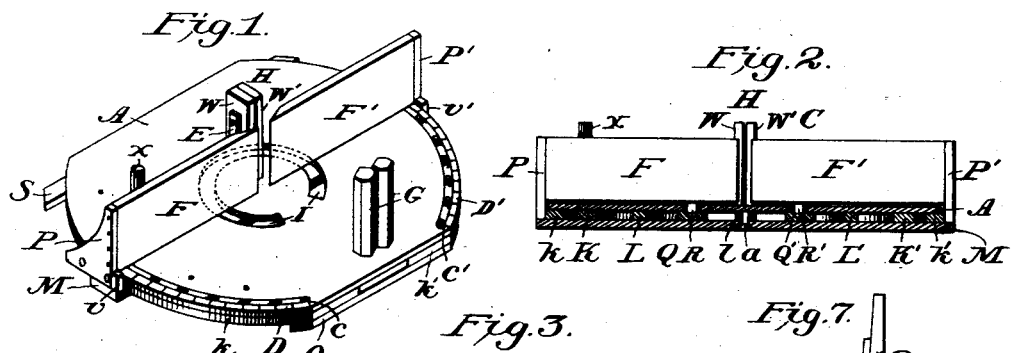
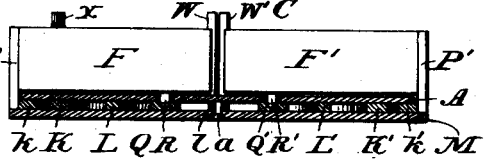
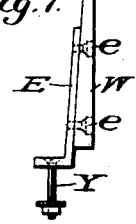
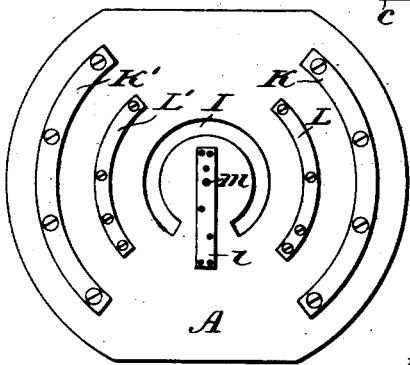
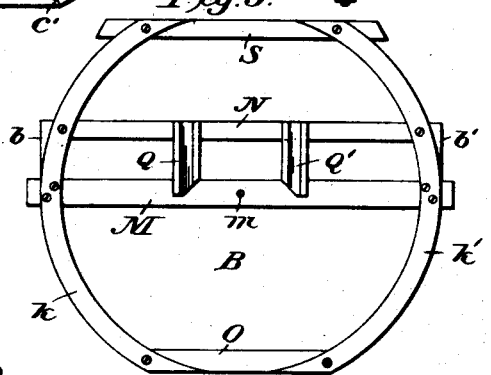
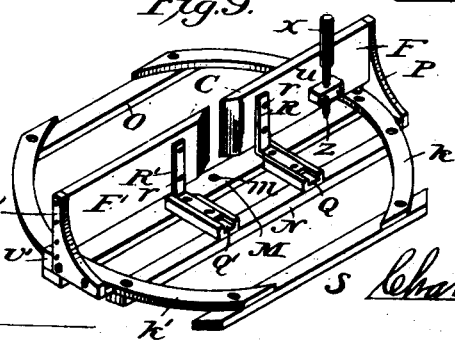
Witnesses:
John P. Allen
John Keller
Inventor:
Charles E. Smith
THE NORRIS PETERS CO., PHOTO-LITHO., WASHINGTON, D. C.

UNITED STATES PATENT OFFICE.

CHARLES E. SMITH, OF NORTH HARVEY, ILLINOIS.

MITER-CUTTER.

SPECIFICATION forming part of Letters Patent No. 525,725, dated September 11, 1894.

Application filed September 24, 1891. Serial No. 406,763. (No model.)

*To all whom it may concern:*

Be it known that I, CHARLES E. SMITH, a citizen of the United States, residing at North Harvey, Cook county, Illinois, have invented a new and useful Miter-Cutter, of which the following is a specification.

My invention relates to improvements in machines for cutting of various miter joints in wood by means of a saw.

The invention consists of, first, a table; second, a frame; third, a set of saw guides; fourth, a clamp screw; in combination each with the other and each of peculiar construction adapted to its part in the combination; and in construction joined with several well known mechanical devices.

The objects of my invention are to produce a miter cutter accurate in its work, of wide capacity, readily operated, simple in construction, easily repaired, portable and adapted to the high tempered thin back fine tooth hand saw used by carpenters. How these objects are attained is explained by the following specification, and illustrated by the accompanying drawings, in which—

Figure 1 is a view in perspective of the complete machine. Fig. 2 shows a vertical section of the machine on a line with the front of the fence; Fig. 3, a view of the top of the table, with the circular lines $c\ c'$ appearing as the outer lines in the graduated arcs next to the line indicating the edge of the table, the circular slot I near the center of the table, the bolt holes for the front saw guides and the grooves which receive the feet of the steel standards of the back saw guides; Fig. 4, a view of the under side of the table showing the position of the cleats K K' L L' $l$ and the place of the center-pin screw $a$ at the center $m$; Fig. 5, a view of the base B which supports both the table A and the fence C; Fig. 6, one of the front saw guides; Fig. 7, a vertical section of one of the back saw guides; Fig. 8, a vertical section of one of the iron standards which support the inner ends of the fence; Fig. 9, a perspective view of the back part of the base B with the fence in place, and showing the position of the iron standards R R' which support the inner ends of the fence; also the clamp $x$.

The table A is in form a nearly circular disk; the front and back sides parallel to each other; the front side a chord of sixty degrees; the ends circular, first permitting the use of graduated scales D D' with verniers $v\ v'$ defining position of saw; the graduated scales and verniers not claimed as my invention. Second. The ends are circular in construction with special reference to the use of the circular lines $c\ c'$ (in connection with graduated scales and directions for using the machine) in ascertaining the proper position of the saw to miter any required joint; the radius of the circular lines $c\ c'$ being the prime dimension in the construction of each machine. Near the center of the table is a circular slot I Fig. 3 engaging the standards R R' (which support the inner ends of the fence pieces F F' Fig. 9) to the extent of one hundred and thirty degrees for each standard; ten degrees allowed for thickness of standard; thus permitting a rotary motion of the table of one hundred and twenty degrees each way. The position of the standards R R' being back of the center of the table, the greater extent of the slot engaging them is also back of the center. The front ends of the slot are seventy five degrees apart. The space in the back part not engaged by the standards is twenty five degrees.

The frame consists of two parts: first, a base B composed of the four bed pieces S M N O, two circular pieces $k\ k'$ two grooved pieces Q Q' and two wedge shaped pieces $b\ b'$, combined as shown in Fig. 5; second, a fence C consisting of four standards P P' Fig. 1 R R' Fig. 9 and the two parts F F' against which the lumber to be cut is placed. The outer ends of the fence pieces F F' are attached to the standards P P' by means of finishing nails driven through the standards into the fence pieces Fig. 1. The inner ends of the fence pieces F F' are attached to the standards R R' by the screws $r\ r$ Fig. 8 which pass through the standards into the fence pieces. The outer fence standards P P' Fig. 1 are wide at the lower end and firmly secured to the parts $k\ k'$ of the base with screws. The inner fence standards R R' are securely fastened to the supports Q Q' Fig. 9 each with a bolt T and screw $s$ Fig. 8 and thus the fence C is rigidly held in position: its vertical front perpendicular to the bearing parts of the base B upon which the table rests.

The front pair of saw guides G Fig. 1 is each a hard-wood right prism, those shown in the drawings being hexagonal in form. They are of sufficient thickness to hold the saw rigidly in position, and of suitable length to inclose the entire width of the saw when in operation. The back pair of saw guides H Fig. 1 is each composed of a rectangular piece of hard wood W from an inch and a half to three inches wide, one end about one fourth, and the other about three eighths of an inch in thickness; and a spring steel standard E Fig. 7 to which the wood is fastened the thicker end downward, by two flat head machine screws $e$ $e'$ the heads counter sunk into the wood beyond the wear of the saw, the points turning into the threaded holes in the steel standards.

The clamp $x$ is a screw, Fig. 9. The lower end which comes in contact with the table in clamping has a combination point, the part $u$ being about three eighths of an inch in diameter and one fourth of an inch long. The point $z$ is about an eighth of an inch in diameter at its base and about an eighth of an inch long.

The cleats K K' L L' $l$ of the table A Fig. 4 and bearing parts $k$ $k$ Q Q' of the base B Fig. 5 are of uniform thickness and so arranged with reference to each other Fig. 2 that the under surface of the table rests on the bearing parts of the base, the cleats on the bed pieces of the base, and is so held in place by the center-pin screw $a$ Fig. 2 which turns readily in M but is driven firmly into the cleat $l$ as to keep the bearing surfaces in contact with each other without hindering the rotation of the table. With the table A thus resting on and secured to the base B and turning freely beneath the fence C, the plane of the vertical front of the fence is always perpendicular to the upper plane of the table A whichever way it may be turned.

The front saw guides G are each secured in a perpendicular position on the table by means of a bolt $g$ Fig. 6 passing through the table into the prism at the center of its base, and turning into a nut inserted through a side of the prism $d$. The hole in the table A is larger than the bolt $g$ permitting the guides to be re-set after they have been worn a little. When further worn after being re-set they may be turned and present a new wearing surface to the saw, until all the sides of the prism have been used. The back saw guides are fastened to the table by placing the foot of the steel standards in a groove $f$ on the table in such a position that the vertical plane of the front edges of the wood pieces W W' are about five eighths of an inch back of the front side of the fence C. The standards E E' are each fastened to the table by a bolt Y Fig. 7 which holds them rigidly in place in an oblique position inclined toward each other so that when the wood pieces are attached with the thicker end downward their inner surfaces near the top touch each other with a slight pressure. By this peculiar form and position of the back saw guides several results are attained. First. Their width together with their constant pressure on the sides of the upper portion of the saw, keeps the saw rigidly in line with the stroke, and perpendicular in position; thus making a smooth and accurate cut. Second. The oblique position of the steel standards admits of a thick wood where the guide wears fastest. Third. The guides H being made thin together with the bevel on the back side of the inner edge of the fence pieces F F' permits the guides to be placed near the lumber to be cut without interfering with the turning of the table. The table is clamped so as to hold the saw at the required angle by means of the thumb screw $x$.

The grooves $f$ in the table A which receive the feet of the steel standards E E' serve to more accurately secure the position of the guides H and also allow the feet to pass under the fence when the table is turned. Clamp combined with frame and table: the clamp screw $x$ is attached to the back side of the fence piece by the screws $i$ $i$ which pass through the block $j$ into F Fig. 9. It is combined with the table by its use as a clamp, securing the table and with it the saw operating in the guide supported by the table.

For the common cuts of square, square miter, and octagon miter the table is bored at the thicker point to facilitate the setting of the machine; as when the thicker point enters the auger hole it cannot be wrong. In uncommon angles the pressure of the thicker point $z$ is sufficient, only more care is required to secure accuracy than with the use of the previously located auger hole, which may be called a check upon the scale used.

The specific claims of my invention are—

1. The combination of the base upon which fixed gages F and F' are secured with the revolving table A arranged in a plane between said gages, and said base, and having a concentrically curved slot I through which pass the supports for said gages, said table carrying saw guides and having a graduated arc for each of said gages, and means for locking such table in adjusted position.

2. The combination of the base upon which fixed gages F and F' are secured with the revolving table A arranged in a plane between said gages and said base, and having a concentrically curved slot I through which pass the supports for said gages, said table carrying saw guides and having a graduated arc for each of said gages, and a series of holes, and a pin carried by one of the gages in position to engage with the holes of such series to lock the table A in adjusted position.

3. In a miter cutter two pairs of saw guides, one pair composed of hard wood right prisms bolted in a vertical position on top of the ble A near one end of the saw line, the other pair each composed of a hardwood rectangular frustum of a wedge, and a spring steel standard, the spring steel standard bolted to the table in an oblique position, and the wood part fastened thereto with the thicker end downward, near the center of the table, all formed and used in the manner, and for the purpose set forth.

4. In a miter cutter used as a combination a clamp composed of a threaded block $j$, and a threaded rod $x$ which turns through the block $j$, the rod $x$ having a handle at the upper end by which it is turned, and at the lower end a combination point $u$ and $z$, said clamp being attached to the back of the fence piece F by means of screws $i, i$, which pass through the block $j$ into the fence piece F, in combination with the table A which is clamped for common cuts by the part $u$ entering a prepared cavity and for other unusual cuts by the points $z$ being pressed into the surface.

CHARLES E. SMITH.

Witnesses:
JOHN BERRY,
ISAAC N. GARD.